United States Patent [19]
Zeller

[11] Patent Number: 5,369,556
[45] Date of Patent: * Nov. 29, 1994

[54] RADIANT-ENERGY TOOL WITH FLEXIBLE EXTENSION

[76] Inventor: Noel E. Zeller, c/c Zelco Industries, Inc., 630 S. Columbus ave., Mount Vernon, N.Y. 10551-4445

[*] Notice: The portion of the term of this patent subsequent to Oct. 13, 2009 has been disclaimed.

[21] Appl. No.: 97,852

[22] Filed: Jul. 26, 1993

Related U.S. Application Data

[63] Continuation-in-part of Ser. No. 743,572, Aug. 9, 1991, Pat. No. DES. 337,839, and a continuation-in-part of Ser. No. 866,035, Apr. 9, 1992, abandoned, which is a continuation of Ser. No. 743,013, Aug. 9, 1991, Pat. No. 5,154,483.

[51] Int. Cl.⁵ ........................................ F21L 9/00
[52] U.S. Cl. ................................ 362/198; 431/255; 126/25 B
[58] Field of Search ................... 362/198; 431/255; 126/25 B

[56] References Cited

U.S. PATENT DOCUMENTS 4,538,983  9/1985  Zeller et al. ................. 431/255
5,154,483  10/1992  Zeller ........................ 362/198
5,199,865  4/1993  Liang ......................... 431/255

FOREIGN PATENT DOCUMENTS 137503   4/1985  European Pat. Off. ......... 431/255
2156499  10/1985  United Kingdom ............. 431/255

*Primary Examiner*—Carroll B. Dority
*Attorney, Agent, or Firm*—Donald S. Dowden

[57] ABSTRACT

A radiant-energy tool (e.g., a flashlight or fire starter) comprises a housing adapted to accommodate an energy source (e.g., a battery pack or a fuel tank) and an elongate extension having a proximal end connected to the housing and a distal end opposite the proximal end adapted to release radiant energy. The extension connects the energy source to the distal end and is formed of a material that can be easily flexed by hand to assume a plurality of different shapes and that can retain a given shape indefinitely. The housing and the distal end of the extension can each be conveniently positioned and oriented independently of the other. The housing is formed with a peripheral groove for accommodating the extension so that the extension can be wrapped around the housing for storage and to provide a compact configuration for use.

3 Claims, 10 Drawing Sheets

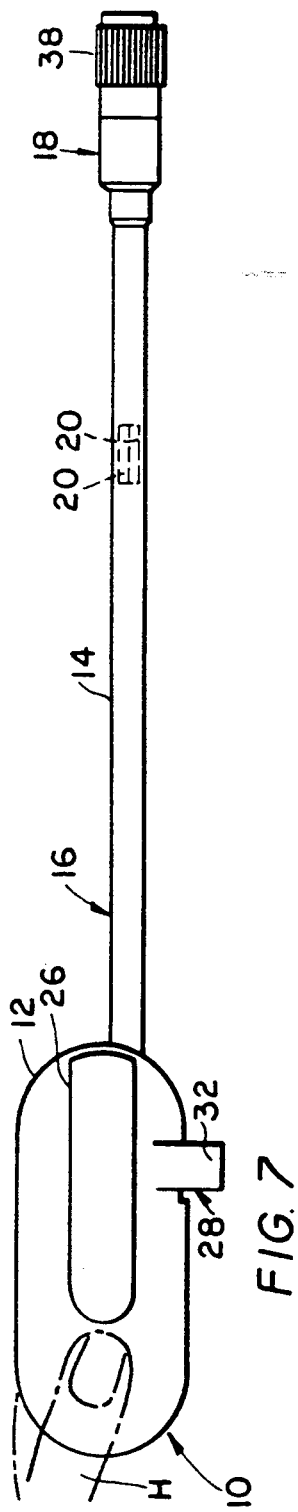
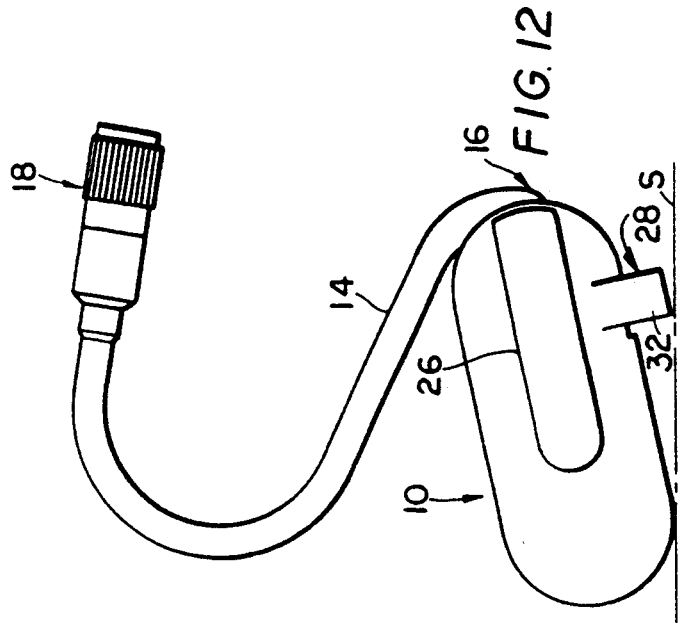
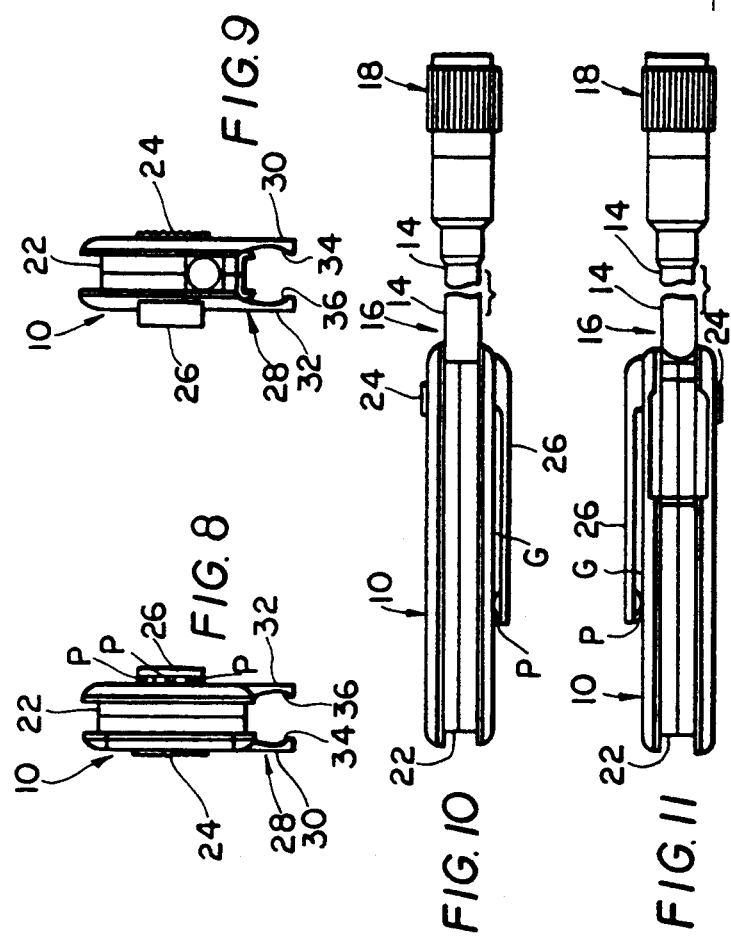

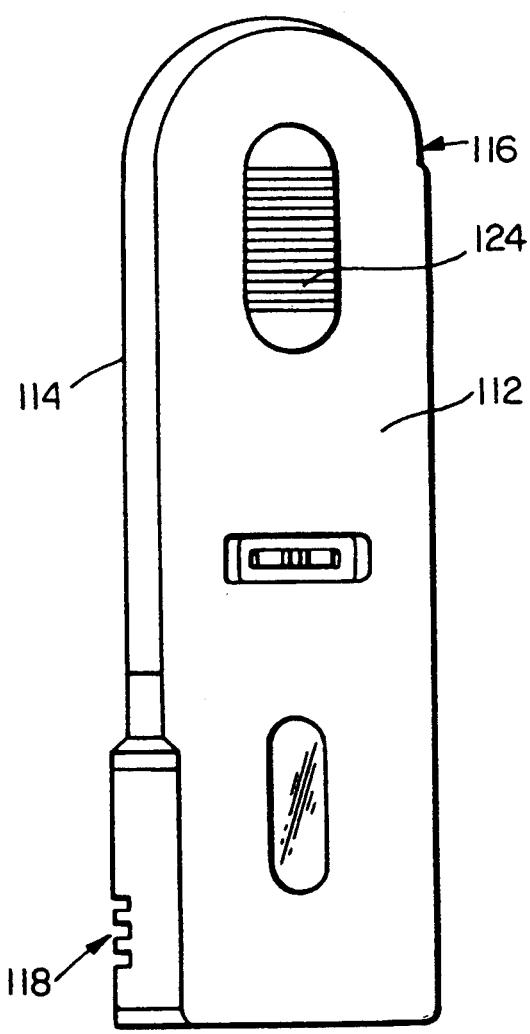
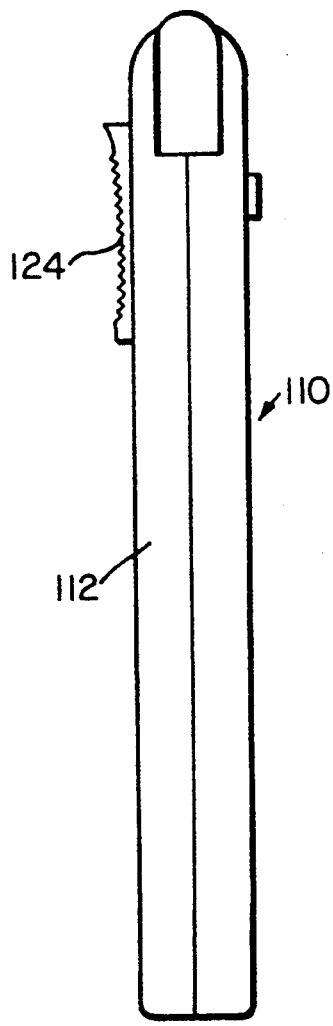
FIG. 17  FIG. 18
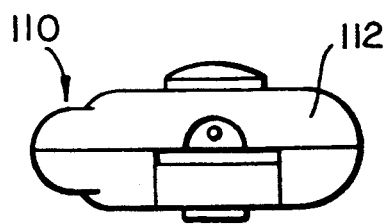
FIG. 19

RADIANT-ENERGY TOOL WITH FLEXIBLE EXTENSION

CROSS-REFERENCE TO RELATED APPLICATION

This is a continuation-in-part of application Ser. No. 07/866,035, filed Apr. 9, 1992, which is abandoned, and which is a continuation of application Ser. No. 07/743,013, filed Aug. 9, 1991, now U.S. Pat. No. 5,154,483. This is also a continuation-in-part of application Ser. No. 07/743,572, filed Aug. 9, 1991, now U.S. Pat. No. D337,839. The present application claims the priority under 35 U.S.C. § 120 of all of said prior applications.

BACKGROUND OF THE INVENTION

1. Field of the Invention

This invention relates to radiant-energy tools such as flashlights and fire starters and more particularly to a novel flashlight and a novel fire starter that are more versatile than conventional ones.

2. Description of the Prior Art

Flashlights or electric torches have been known for many decades and have antecedents in flaming torches and lanterns that have been known for centuries. From time immemorial there has been a need for a portable source of light that can be used at night and at other times when the general illumination is poor.

The invention of the electric flashlight was a major advance in the technology of portable, personal light sources. As compared to older forms of such light sources, the electric flashlight has many advantages: it can be easily and instantly turned on and off, it is "clean" (not messy to handle), it produces no smoke or odor, it is silent in operation, it produces good illumination, and it is quite safe for use, even by children. Moreover, modern flashlights can be made small enough to fit easily into a pocket or purse or the glove compartment of a car. Even though small, they produce good illumination, especially in view of recent improvements in battery and bulb technology.

However, despite the excellent characteristics of modern flashlights, they have certain drawbacks. A major drawback of conventional flashlights is that they are awkward to use under certain circumstances, as when it is necessary to employ both hands to perform a task that requires illumination. Examples include operating a battery-powered screwdriver, cutting cloth with scissors, examining documents, writing (while steadying the paper), setting a watch, sorting clothes, and searching for a small object in a purse or briefcase. When the general illumination is low, persons performing these and similar tasks with the aid of a flashlight resort to tucking the flashlight under an arm, cradling it between the neck and shoulder, balancing it on a nearby table, mantel or ledge, even holding it in the mouth, etc.

None of these makeshifts is very satisfactory. If it is necessary, for example, to employ a tool under the hood of a car, it is pure happenstance if a way can be found to balance a conventional flashlight on some portion of the car's fender or engine in such a manner that it illuminates the work properly. Similarly, if during a power outage the contents of a briefcase on a table are to be searched with the aid of a conventional flashlight resting on a mantel, it is unlikely that the interior of the briefcase will be adequately illuminated. That may leave a choice of hoisting the briefcase substantially to the height of the mantel and tilting it precariously to illuminate the interior, thereby foregoing the use of one hand in rummaging through the contents of the briefcase, or, better, leaving the briefcase on the table, holding the flashlight in one hand and rummaging with the other. In either case, only one hand is available for the task presented, the other being committed to holding the briefcase or the flashlight.

Another drawback of conventional flashlights is that they are rather specialized. The familiar cylindrical flashlight is designed specifically to be held in the hand. It is not well adapted to be worn on a belt, for example. On the other hand, there are conventional "right-angled" flashlights specialized for wearing on the belt. Such flashlights typically have a cylindrical battery housing adapted to be secured to a belt by a clip so that the axis of the cylindrical housing is vertical. The light bulb, reflector and lens are constructed to project the light in a direction at right angles to the cylindrical housing axis, that is to say horizontally. Such a light can be worn to light the way while walking and frees the hands to carry camp gear, books, tools or whatever. However, except for this specialized use, the right-angled flashlight is no better than the straight cylindrical flashlight. It is, in other words, not very versatile.

Book lights specialized for reading in bed, while traveling, etc., as disclosed in applicant's earlier U.S. patents, are also known, as are portable fluorescent lights as disclosed in applicant's earlier U.S. patent. Such lights can be designed to operate on house current, batteries, or both. A book light is excellent for its intended purpose, but, even if battery-powered, does not function as an all-purpose flashlight. A portable fluorescent light also gives excellent service, but it does not provide a complete solution to the problems of the prior art.

Another drawback of conventional flashlights is that they often will not reach an area in a crowded environment that requires illumination. The engine compartment of a modern car, for example, is crowded with hoses, belts and wires that limit access by tools. Sometimes it is necessary to illuminate a work area deeply recessed within the engine compartment so that a conventional flashlight must be held at a considerable distance from the work area. The tool in use may preempt the space along the line of sight to the work area, so that the flashlight must illuminate the work area from a different angle. When the flashlight cannot be brought close to the work area, the hoses, belts, wires, etc., may cast deep shadows that prevent adequate illumination of the work area.

Attempts have been made heretofore to improve the versatility of flashlights. For example, flashlights are commonly made with a focusing adjustment to enable selection of a floodlight or a spotlight. Also, flashlights are sometimes provided with lenses of different colors (red, yellow, clear, etc.) so that they can be used primarily for illumination (clear lens), warning (red lens), signaling (red lens, clear lens, etc.), illumination combined with adaptation to the dark (red lens), or another purpose. However, prior attempts to increase the versatility of the flashlight have met with only limited success, and the most advanced flashlights of today, while benefitting from recent improvements in battery and bulb technology, are in their basic design virtually indistinguishable from flashlights that were commercially available decades ago.

In order to start a fire in a fireplace or stove or light a charcoal grill, it is the usual practice to lay a fuel bed and set a lighted match to it. In the case of a fireplace, the fuel bed often includes logs laid on top of kindling and crumpled newspapers. In the case of an outdoor grill, the fuel bed often includes charcoal briquettes. In both cases, it is the practice of many people to add a petroleum-based fluid or gel as a starting fuel.

Starting a fire is recognized as a dangerous procedure, especially if a liquid or gel starter fluid is used. Starter fuel is highly flammable and more or less volatile, depending on the choice of starter fuel.

Despite warnings, every year some people use gasoline as a starter fuel and are severely burned because of the extreme volatility of gasoline and the tendency of the vapor rising from the fuel bed to explode at the approach of a lighted match.

Kerosene is a less volatile and a safer starter fuel than gasoline but still dangerous, especially if used by people with no special training in starting fires.

Various commercial products have been developed expressly for use as starter fuels. While such products may be relatively nonvolatile, they must be sufficiently flammable to be lighted by brief contact with a lighted match and thus cannot be regarded as completely safe. In fact, a starter fuel that is insufficiently volatile and flammable ceases to be useful for its intended purpose.

The danger is all the greater because a match is usually relatively short and becomes shorter still as it burns. Thus the fingers of a person—even a very careful person—starting a fire may be literally only a fraction of an inch from the flame when the starter fuel ignites. A person trying to start a fire using a relatively "safe" starter fuel may find that the match burns down and singes the fingers before it ignites the starter fuel.

Another problem attendant upon starting a fire in a fireplace or grill is that fireplaces and grills usually have an abundance of ashes and soot and manage to dirty the hands of a person using a match to start a fire, especially since the hands must get very close to the bed of fuel in order to get the flame of the match in all the right places. In order to give the fire a good start, it is desirable to place the flame of the match in contact with the fuel bed at a number of spaced-apart locations. Moreover, these locations should be at or near the bottom of the fuel bed, since heat rising from a part of the fuel bed that has been ignited ignites fuel more readily at a higher level than at a lower level. This requires that the person starting the fire poke the match deep into the fuel bed, and it is nearly inevitable that the hands become soiled in the process.

Attempts have been made heretofore to make the process of starting a fire safer and cleaner. An old technique is to use a match only to light a taper and use the taper to light the fuel bed. Makeshift tapers such as a rolled-up sheet of newspaper or strip of cardboard are often employed. Such tapers leave much to be desired, however. They burn down at a rate that is unpredictable and produce a flame of unpredictable size. In many cases they produce ash that may fall outside the fireplace, stove or grill. They are inconvenient to make and in many cases they are suitable to be used only once, then thrown into the fireplace, stove or grill and consumed; often a search must be made for a suitable material, and sometimes none is at hand.

A much better alternative, of which the present applicant is a joint inventor, replaces both a match and a taper and is disclosed in U.S. Pat. No. 4,538,983. This devices comprises a housing for a fuel container, a piezoelectric igniting device, and an extension tube mounted on the forward end of the housing and pivotable from a folded position to an extended position. A flame can be provided at the distal end of the extension tube, remote from the user's hand. The housing has a recess in which a pushbutton is positioned for supplying the fuel and actuating the igniting device simultaneously. When the extension tube is folded, it lies parallel to the housing over the recess and the pushbutton so that the lighter cannot be accidentally ignited. Applicant hereby incorporates the disclosure of that patent herein by reference.

The fire starter described in the cited patent has enormous advantages as compared to the use of a match and taper. However, it does not represent a complete solution to the problem of starting fires. Consider the following situation, which is often encountered: a grate supporting the fuel bed may be reachable only over the top of some barrier such as the rim of a bowl of a charcoal grill or the lower edge of a stove doorway. In order to get the flame to various points at or near the bottom of the fuel bed, it may be necessary, for example, to insert the hand all the way into the grill or stove. In some cases, there is simply no way to position the flame ideally with respect to the fuel bed, given the rigidity of the pivotable extension. The problems of danger, dirt and inconvenience mentioned above in connection with matches and tapers have thus not been entirely avoided by recent advances in the art.

OBJECTS AND SUMMARY OF THE INVENTION

An object of the invention is to remedy the drawbacks of conventional radiant-energy tools noted above. In particular, an object of the invention is to provide a flashlight and a fire starter that are more versatile and easier to use under a variety of conditions than any flashlight or fire starter known heretofore.

Another object of the invention is to provide a flashlight that can be used as a task light or as a clip-on light and that is compact yet has a reach long enough to be brought close to an area requiring illumination in a crowded environment.

Another object of the invention is to provide a fire starter that is ideally adapted to starting fires in stoves, ovens, fireplaces, grills, etc., with safety and convenience, and without mess, regardless of various obstacles such as an inconvenient construction or location of the fuel bed.

The foregoing and other objects are obtained in accordance with the invention by the provision of a radiant-energy tool comprising a housing adapted to accommodate an energy source and an elongate extension having a proximal end connected to the housing and a distal end opposite the proximal end adapted to release radiant energy. The elongate extension conducts energy from the energy source to the distal end and is formed of a material that can be easily flexed by hand to assume a plurality of different shapes and that can retain a given shape indefinitely so that the housing and distal end of the extension can each be conveniently positioned and oriented independently of the other. The housing is formed with a peripheral groove for accommodating the extension so that the extension can be wrapped around the housing for storage.

In one preferred embodiment of the invention the radiant-energy tool takes the form of a flashlight; in another it takes the form of a fire starter.

If the radiant-energy tool is a flashlight, the source of energy is preferably a pair of AAA batteries, the distal end of the extension accommodates a light bulb, and energy-transfer means is provided comprising a pair of conductive leads adapted to connect the battery to the bulb to transfer energy to the distal light-radiating portion in the form of electricity. However, it is within the scope of the invention to generate the light in or near the housing and to employ fiber optics or another form of light guide to transfer energy to the distal light-radiating portion in the form of light.

If the radiant-energy tool is a fire starter, the source of energy is preferably butane or any suitable lighter fluid or starter fuel, and the flexible extension is formed with a conduit that conducts the fuel to the distal end, where a flame is supported.

BRIEF DESCRIPTION OF THE DRAWING

A better understanding of the objects, features and advantages of the invention can be gained from a consideration of the following detailed description of the preferred embodiment thereof, in conjunction with the appended figures of the drawing, wherein a given reference character always refers to the same element or part and wherein:

FIG. 7 is a view corresponding to FIG. 1 showing the extension in a second or long-reach configuration;

FIG. 8 is a view from the left of FIG. 7;

FIG. 9 is a view from the right of FIG. 7;

FIG. 10 is a broken view from the top of FIG. 7;

FIG. 11 is a broken view from the bottom of FIG. 7;

FIG. 12 is a view corresponding to FIGS. 1 and 7 showing the extension in a third configuration;

FIG. 17 is a view in side elevation of the tool of FIG. 16;

FIG. 18 is a view in elevation from the right side of FIG. 17;

FIG. 19 is a view from the bottom of FIG. 17;

DESCRIPTION OF THE PREFERRED EMBODIMENTS

Figure 1:
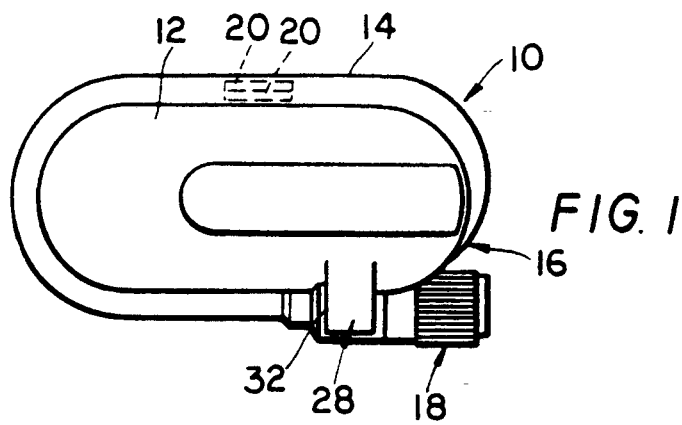
FIG. 1 is a view in side elevation of a first embodiment of a radiant-energy tool, viz. a flashlight, constructed in accordance with the invention and including an elongate member in the form of a housing and its extension, the extension being flexible and coiled in a first or compact configuration.
Figure 2:
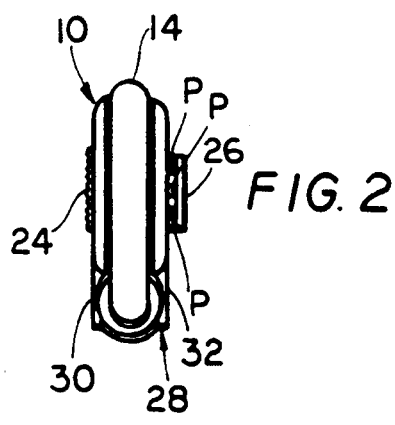
FIG. 2 is a view in elevation from the left side of FIG. 1.
Figure 3:
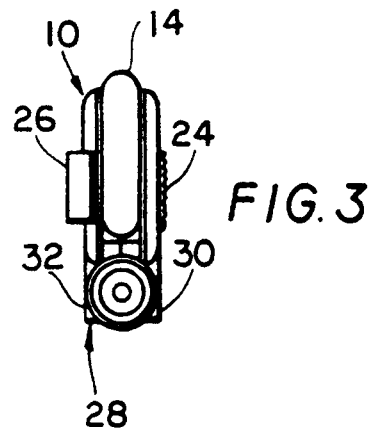
FIG. 3 is a view in elevation from the right side of FIG. 1.
Figure 4:
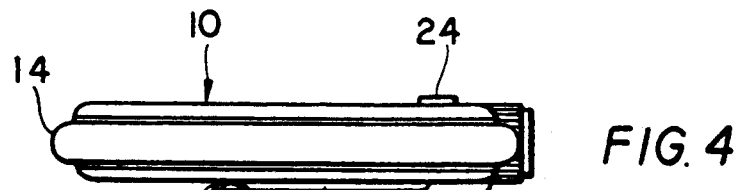
FIG. 4 is a view from the top of FIG. 1.
Figure 5:
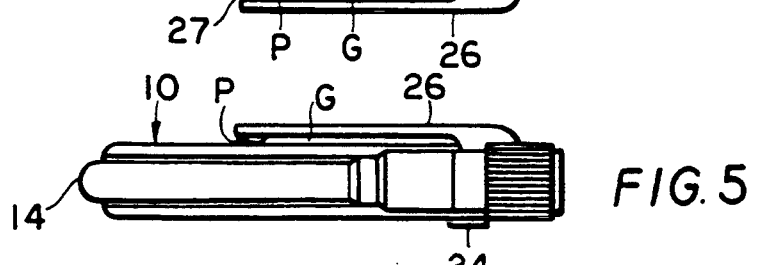
FIG. 5 is a view from the bottom of FIG. 1.
Figure 6:
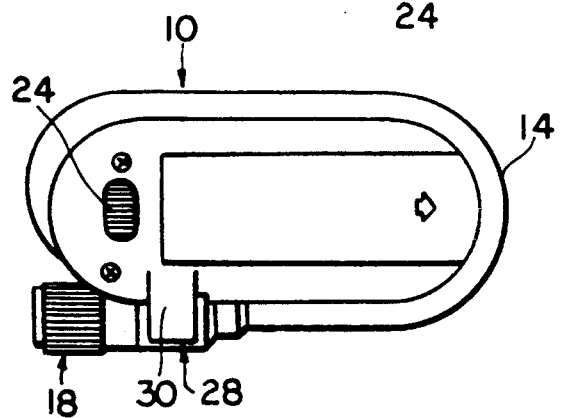
FIG. 6 is a view from the rear of FIG. 1.

FIGS. 1–15 show a flashlight 10 constructed in accordance with the invention. The flashlight 10 comprises an elongate member formed as a housing 12 and an elongate extension 14. The housing 12 is adapted to accommodate one or more batteries (not shown), for example a pair of AAA batteries. The extension 14 has a proximal end 16 connected to the housing 12 and a distal end 18 opposite the proximal end 16 and adapted to accommodate a light bulb (not shown). Conductive leads 20 carried by the extension 14 are adapted to connect the battery to the bulb. The extension 14 is formed in such a manner that it can be easily flexed by hand to assume a plurality of different shapes and can retain a given shape indefinitely. Examples of such construction are found in gooseneck lamps. Preferably, seven or eight strands of copper wire are twisted to form the gooseneck extension. Thus the housing 12 and the bulb can each be conveniently positioned and oriented independently of the other.

Figure 13:
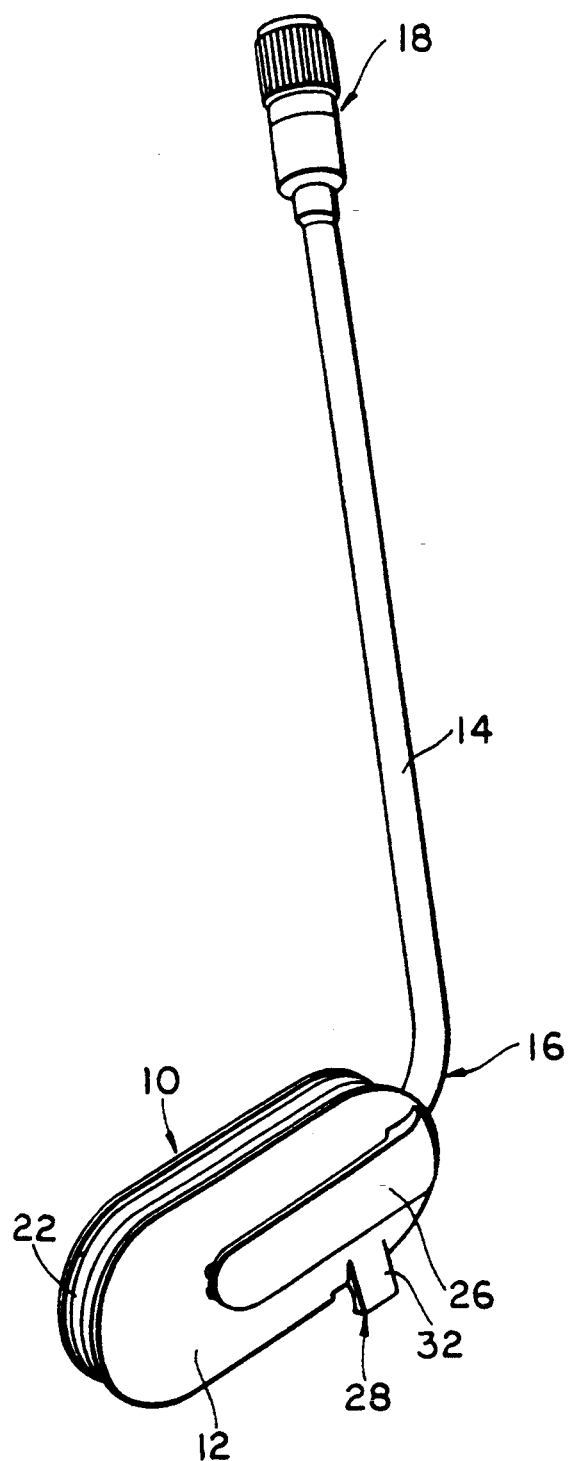
FIG. 13 is a perspective view showing the extension in a fourth configuration.
Figure 15:
FIG. 15 is a plan view of the inside of the battery cover.
Figure 14:
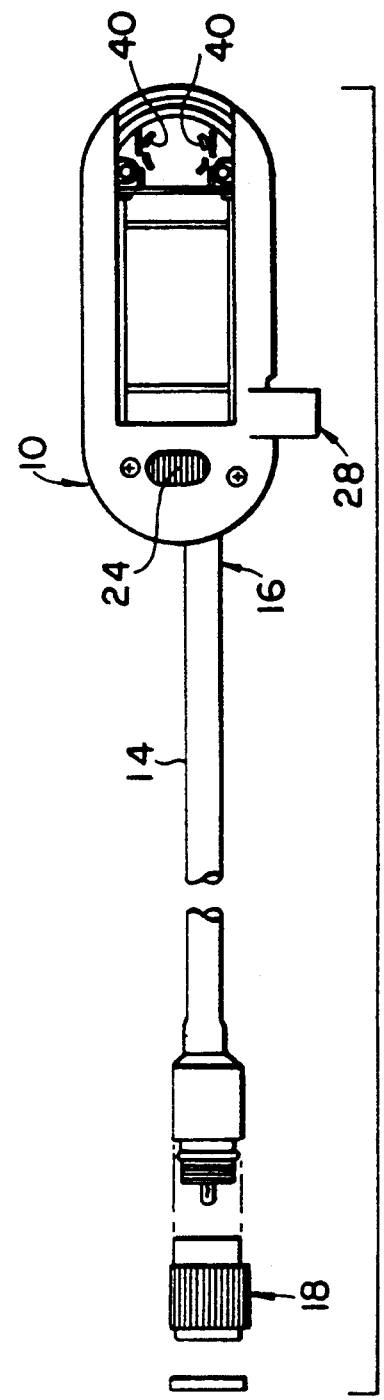
FIG. 14 is a broken view corresponding to FIG. 7 from the rear thereof, partly exploded and with a battery cover removed.
Figure 16:
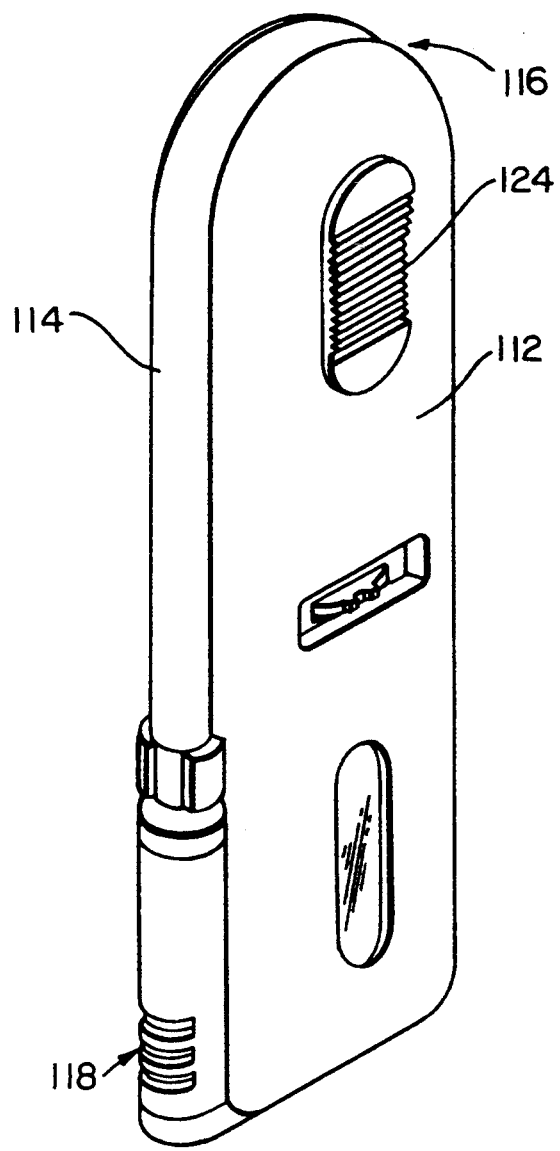
FIG. 16 is a perspective view of a second embodiment of a radiant-energy tool, viz. a fire starter, constructed in accordance with the invention and including an elongate member in the form of a housing and its extension, the extension being flexible and coiled in a first or compact configuration.
Figure 20:
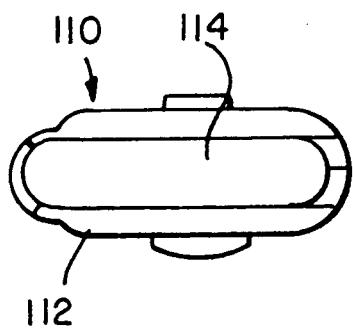
FIG. 20 is a view from the top of FIG. 17.
Figure 21:
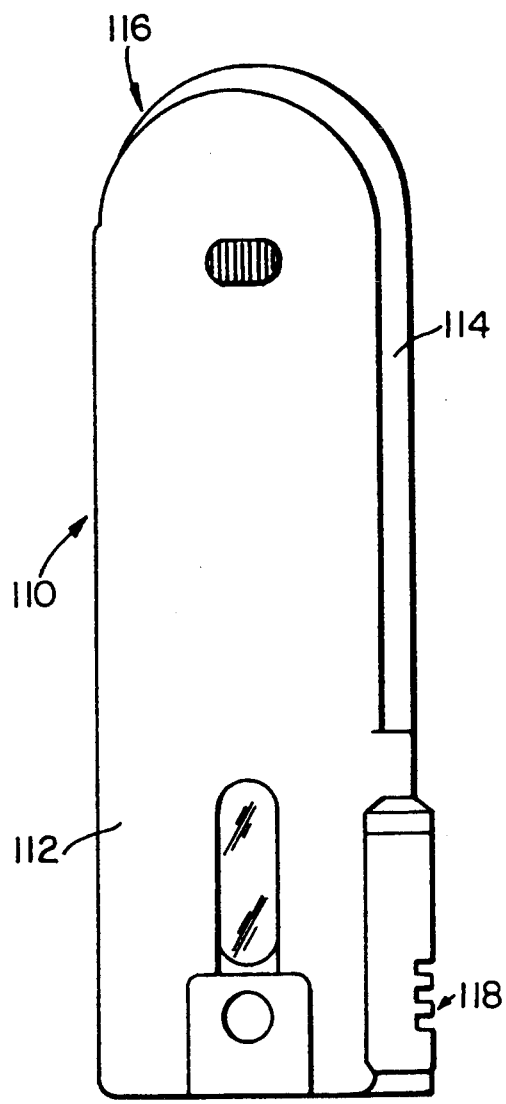
FIG. 21 is a view from the rear of FIG. 17.
Figure 22:
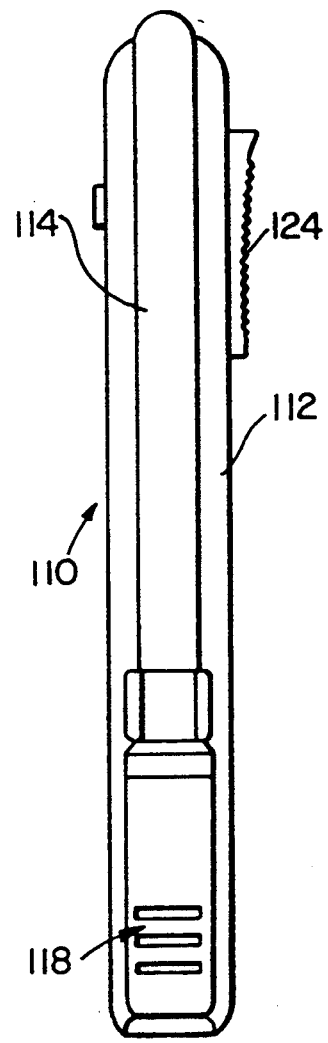
FIG. 22 is a view from the left side of FIG. 17.

FIGS. 1–6 illustrate a first configuration or relative orientation of the housing 12 and bulb; FIGS. 7–11 and 14 illustrate a second relative orientation; FIG. 12 illustrates a third relative orientation; and FIG. 13 illustrates a fourth relative orientation. From these few examples, it is clear that the number of different possible relative orientations of the housing 12 and bulb is essentially unlimited.

In the first configuration or relative orientation, the extension 14 is coiled around the housing 12. As FIGS. 8–11 and 13 best illustrate, the housing 12 is formed with a peripheral groove 22 for accommodating the extension 14 so that the extension 14 can be wrapped around the housing 12 as illustrated in FIGS. 1–6. This provides a compact configuration for use, especially when the flashlight is held in the hand. In the configuration of FIGS. 1–6, the flashlight 10 is moreover adapted to be carried neatly in a pocket or purse or to be stored for easy access in the glove compartment of a car, a corner of a bureau drawer, a bedside stand, a hall table, etc.

The flashlight 10 includes an on-off switch 24 mounted on the housing 12 on one side thereof and a belt clip 26 mounted on the housing 12 on the other side thereof. With the extension 14 wound around the housing 12 and accommodated within the groove 22, the distal end 18 of the extension 14 is near the "head" end of the housing 12 where the on-off switch 24 and bulb are located (see FIG. 6). This enables convenient operation of the on-off switch 24 by the thumb of a hand holding the flashlight. The flashlight 10 thus can conveniently be held in the hand and operated as a compact flashlight. In a preferred size, in which it runs on a pair of AAA batteries, it has about the size (but not the shape or appearance) of a conventional penlight.

The clip 26 is a spring clip and has one or more protrusions P (FIGS. 2, 4, 5, 8, 10, 11) that bear against one surface of the housing 12. A gap G best shown in FIGS. 4, 5, 10 and 11 is thus left between the clip 26 and the housing 12. The gap G provides a space for accommodation of, for example, the belt of a user of the flashlight 10. The flashlight 10 can therefore be clipped to clothing such as the belt or a pocket of a user, and the extension 14 can be bent so that it projects light, for example, in the direction in which the user of the flashlight 10 is walking or towards a task in which the user is engaged. The light 10 thus functions in the manner of a "right-angled" flashlight of greatly expanded capability, in view of the unlimited freedom with which the light can be directed.

A retainer 28 comprising a pair of arms 30 and 32 is mounted on the housing 12 for engaging the extension 14 when the extension 14 is accommodated in the groove 22, thereby assisting in retaining the extension 14 in the groove 22. As FIGS. 8 and 9 best show, the arms 30 and 32 extend from opposite sides of the housing 12 in opposed parallel relation, and the surface of each arm that faces the other arm is concave. The outer rolled edges 34 and 36 of the arms 30 and 32 are separated by a distance slightly less than the diameter of the distal end 18 of the extension 14 so that, when the distal end 18 of the extension 14 is forced into the retainer 28, the arms 30 and 32 are first bent slightly away from each other. When the distal end 18 of the extension 14 is fully accommodated within the retainer 28, the arms 30 and 32 snap back substantially to their respective positions shown for example in FIGS. 8 and 9, and the rolled edges 34 and 36 prevent accidental dislodgement of the extension 14. At the same time, the flexibility of the arms 30 and 32 enables the distal end 18 of the extension 14 to be withdrawn from the retainer 28 by pulling the distal end 18 of the extension 14 away from the housing 12.

In the configuration of FIGS. 7-11 and 14, the flashlight 10 can be used to reach spaces in a crowded environment that would otherwise be inaccessible. As illustrated in FIG. 7, a hand H of a user may hold the flashlight 10 at a position considerably removed from the distal end 18 of the extension 14. Thus the flashlight is capable of being brought to bear on a workspace or other area of interest which, in a crowded environment, may be inaccessible to conventional flashlights.

In the configuration of FIG. 12, the retainer 28 functions also as a base to assist in supporting the flashlight 10 on a supporting surface S. The flexibility of the extension 14 together with its ability to retain any shape it is given enables it to function as a gooseneck, as illustrated for example in FIG. 12. In the configuration of FIG. 13, the light is directed upwardly, for example against a low ceiling to provide general illumination. Note that the extension 14 can be oriented so that the light is projected in any direction. In FIG. 12, for example, the light is not limited to projection in the plane of the illustration; on the contrary, the extension 14 can be bent so that the light is projected into or out of the plane of the illustration, including directly away from or directly towards the viewer. Although not illustrated, the extension 14 can be looped or tied around a doorknob, basement pipe, protruding nail, etc. In short, there is no limitation on the direction in which the light can be projected, regardless of the orientation of the housing 12. Nor is there any limitation on the position of the bulb relative to the housing 12, so long as it is within the work space defined by the length of the extension 14.

In accordance with the invention, focusing means 38 is preferably mounted at the distal end 18 of the extension 14 for selecting a floodlight or a spotlight. The focusing means 38 comprises a main lens. Moreover, a mount 40 (FIG. 14) in the housing 12 accommodates a spare lens. The main lens may be, for example, clear and the spare lens red, but of course it is within the scope of the invention to employ lenses of other characteristics. Moreover, additional spare lenses can be accommodated in the housing 12. The mount 40 also accommodates a spare bulb.

The flashlight 10 is preferably made largely of plastic. In particular, the casing 12, on-off switch 24, spring clip 26 and retainer 28 can be made of plastic. The flashlight 10 is thus inexpensive to manufacture and can be made available to consumers at an affordable price.

FIGS. 16-25 show a fire starter 110 constructed in accordance with the invention. The fire starter 110 comprises an elongate member formed as a housing 112 and an elongate extension 114. The housing 112 is adapted to accommodate a source of energy, for example butane. The extension 114 has a proximal end 116 connected to the housing 112 and a distal end 118 opposite the proximal end 116 and adapted to support a flame (not shown). The extension 114 is hollow and adapted to conduct the fuel to the distal end of the extension 114. The extension 114 is formed in such a manner that it can be easily flexed by hand to assume a plurality of different shapes and can retain a given shape indefinitely. Examples of such construction are found in gooseneck lamps. Thus the housing 112 and the distal end of the extension can each be conveniently positioned and oriented independently of the other.

Figure 23:
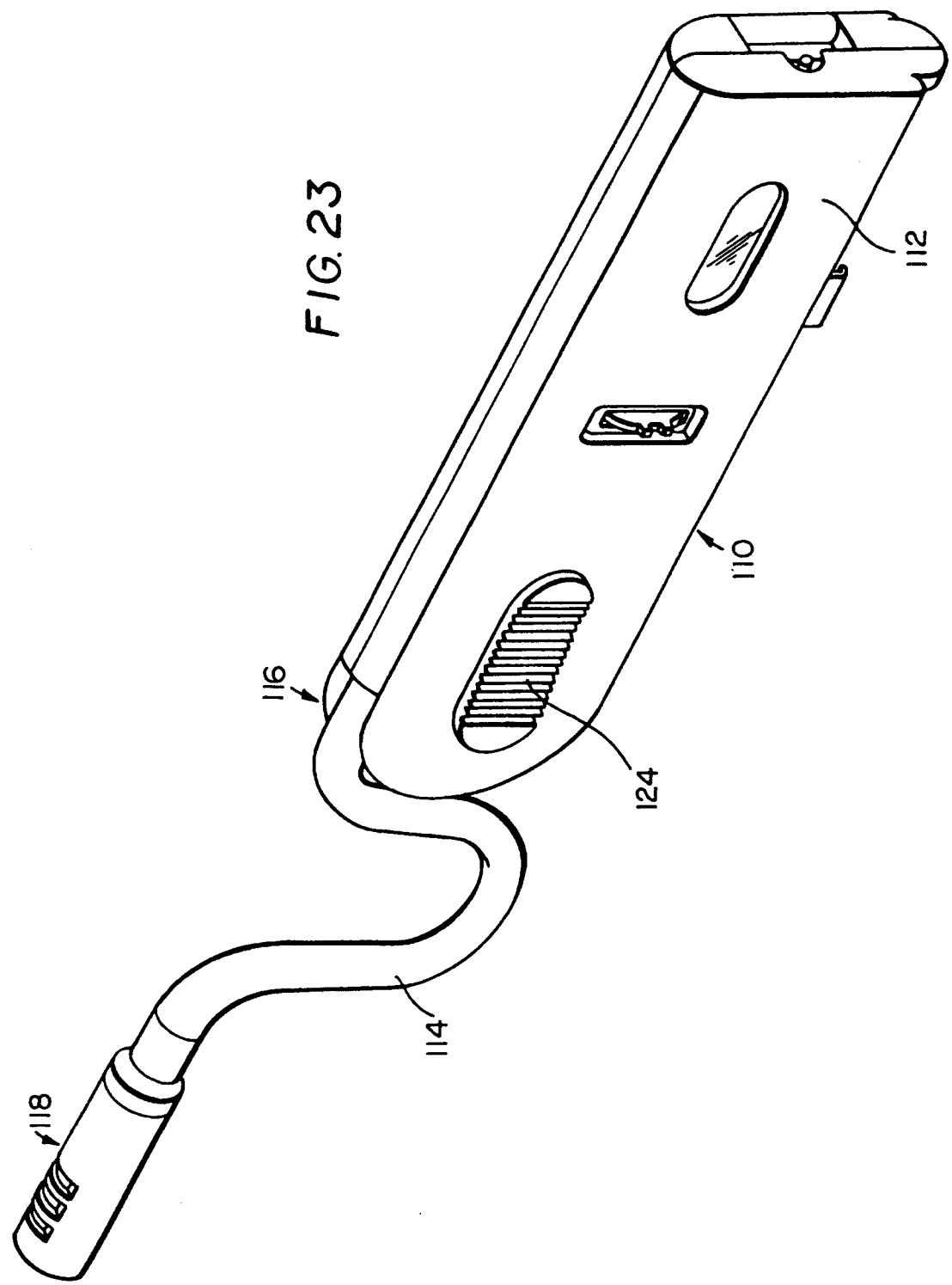
FIG. 23 is a perspective view showing the flexible extension extended In a first position.
Figure 24:
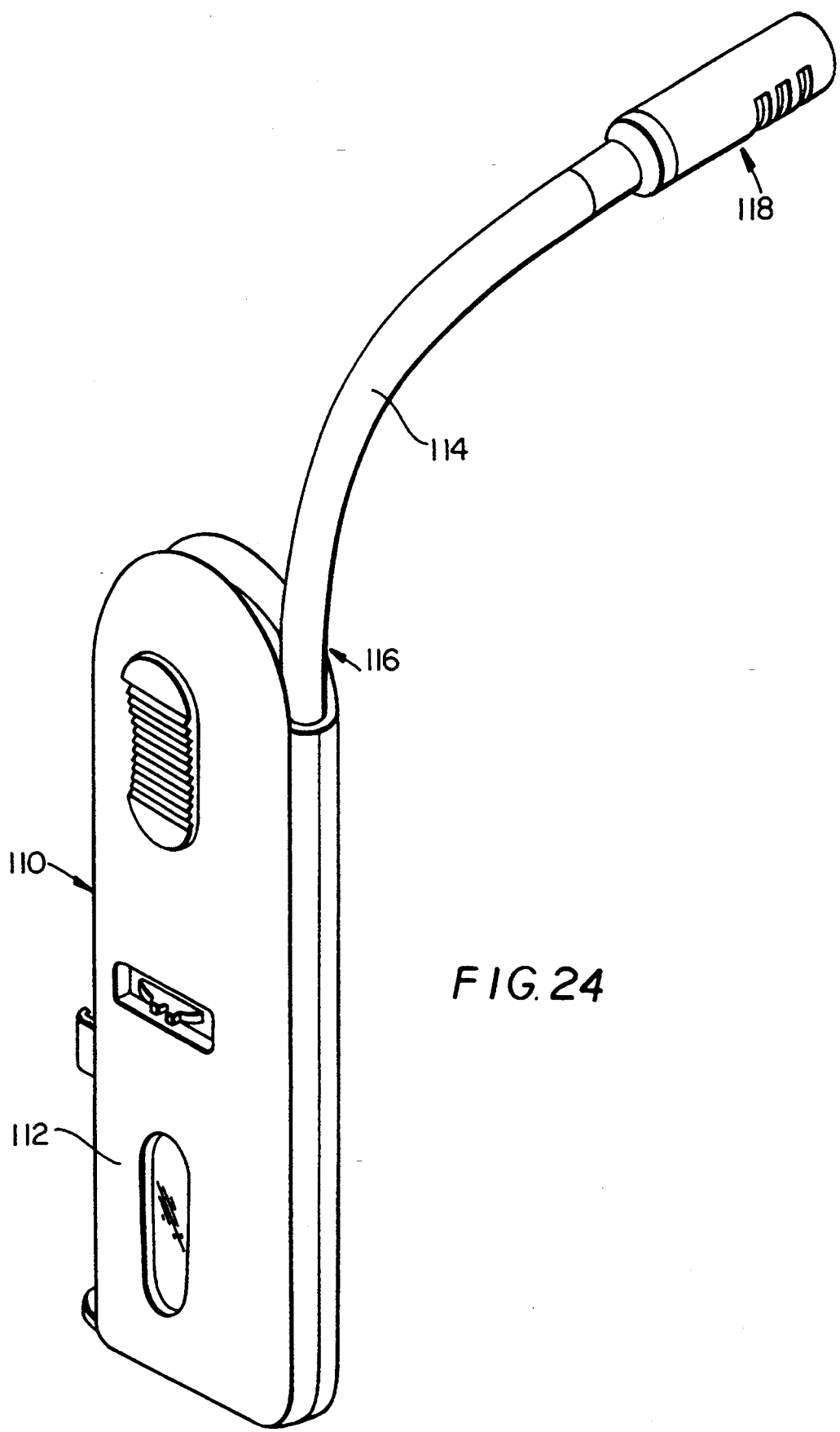
FIG. 24 is a perspective view showing the flexible extension extended in a second position.
Figure 25:
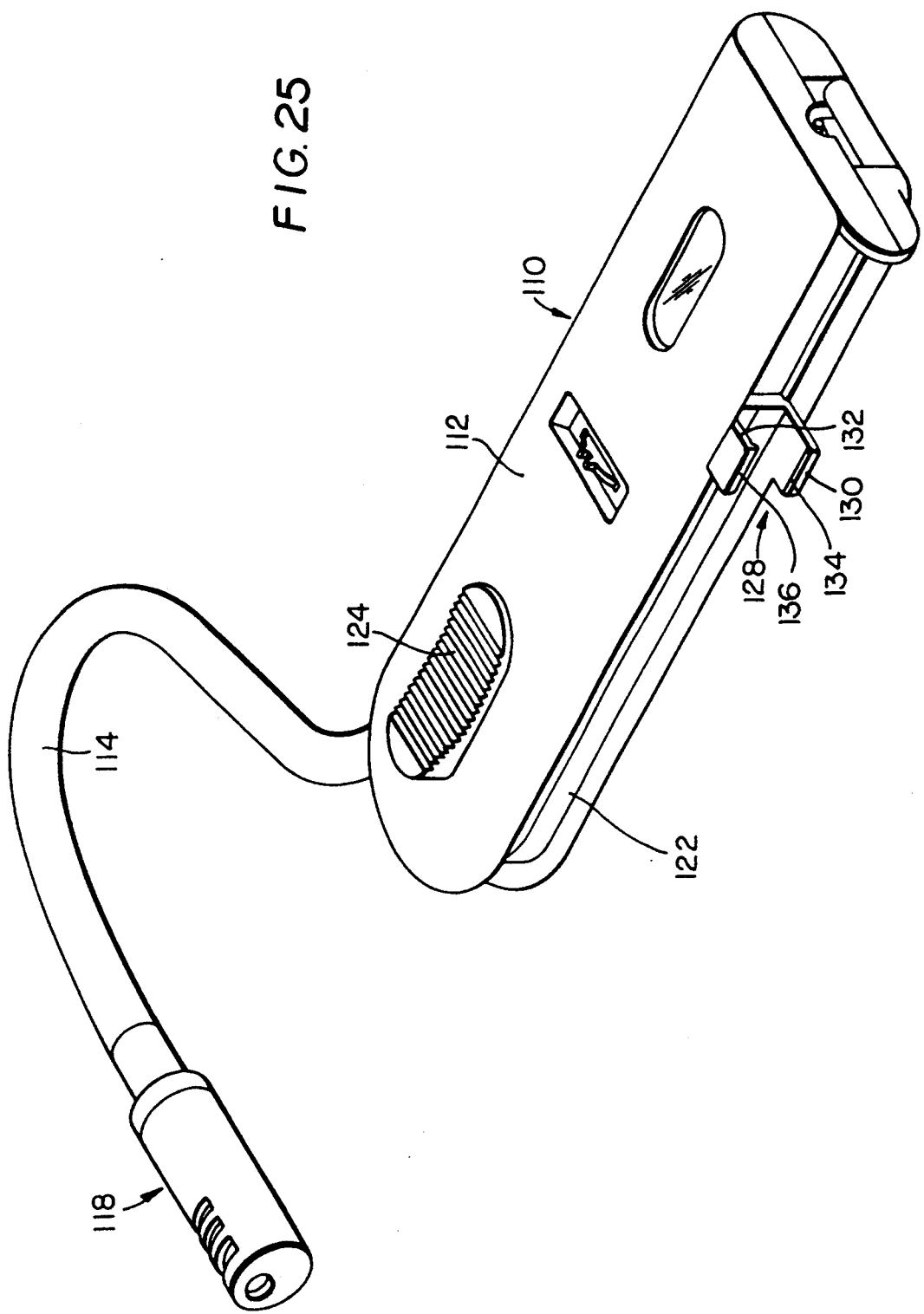
FIG. 25 is a perspective view showing the flexible extension extended in a third position.

FIGS. 16-22 illustrate a first configuration or relative orientation of the housing 112 and bulb; and FIGS. 23-25 illustrate second through fourth relative orientations. From these few examples, it is clear that the number of different possible relative orientations of the housing 112 and distal end of the extension is essentially unlimited.

In the first configuration or relative orientation, the extension 114 is coiled around the housing 112. As the figures illustrate, the housing 112 is formed with a peripheral groove 122 for accommodating the extension 114 so that the extension 114 can be wrapped around the housing 112. This provides a compact configuration for holding the fire starter in the hand or carrying it in a pocket or purse or in the glove compartment of a car, or storing it in a corner of a bureau drawer, a bedside stand, a hall table, etc.

The fire starter 110 includes a switch 124 mounted on the housing 112 on one side thereof. A retainer 128 comprising a pair of arms 130 and 132 is mounted on the housing 112 for engaging the extension 114 when the extension 114 is accommodated in the groove 122, thereby assisting in retaining the extension 114 in the groove 122. The arms 130 and 132 extend from opposite sides of the housing 112 in opposed parallel relation, and the surface of each arm that faces the other arm can be made slightly concave. The outer rolled edges 134 and 136 of the arms 130 and 132 are separated by a distance slightly less than the diameter of the distal end 118 of the extension 114 so that, when the distal end 118 of the extension 114 is forced into the retainer 128, the arms 130 and 132 are first bent slightly away from each other. When the distal end 118 of the extension 114 is fully accommodated within the retainer 128, the arms 130 and 132 snap back substantially to their respective positions shown for example in FIG. 25, and the rolled edges 134 and 136 prevent accidental dislodgement of the extension 114. At the same time, the flexibility of the arms 130 and 132 enables the distal end 118 of the extension 114 to be withdrawn from the retainer 128 by pulling the distal end 118 of the extension 114 away from the housing 112.

In the configuration of FIGS. 23-25, the fire starter 110 can be used to reach spaces in a crowded environment that would otherwise be inaccessible. A hand of a user may hold the fire starter 110 at a position considerably removed from the distal end 118 of the extension 114. Moreover, because of the flexibility of the extension, the fire starter is capable of introducing a flame to locations which, in a crowded environment, may be inaccessible to conventional fire starters.

The flexibility of the extension 114 together with its ability to retain any shape it is given enables it to function as a gooseneck, as illustrated for example in FIGS. 23-25.

The fire starter 110 is preferably made largely of plastic. In particular, the casing 112, switch 124, and retainer 128 can be made of plastic. The fire starter 110 is thus inexpensive to manufacture and can be made available to consumers at an affordable price.

Thus there is provided in accordance with the invention a radiant-energy tool such as a flashlight or fire starter that is more versatile than conventional such tools. The tool remedies the drawbacks of conventional tools noted above and in particular is easier to use under a variety of conditions than any such tools known heretofore. Moreover, the flashlight in accordance with the invention can be used as a task light or as a clip-on light and is compact yet has a reach long enough to be brought close to an area requiring illumination in a crowded environment; and the fire starter in accordance with the invention is easy to use, highly adaptable and safe.

Many modifications of the preferred embodiments of the invention disclosed above will readily occur to those skilled in the art upon consideration of this disclosure. For example, the length of the extension 14 or 114 can be varied within wide limits. Also, the tool can be made in different sizes, the flashlight can be powered by batteries larger or smaller than AAA size, and different fuels can be employed in the fire starter. Moveover, as indicated above, the housing 12 or 112 may be attached to a portion of the extension 14 or 114 different from the illustrated places of attachment; or the housing 12 or 112 and extension 14 or 114 can be merged into a single elongate member, at least a portion of which is flexible and can retain a given shape indefinitely. Accordingly, the invention is not limited except by the appended claims.

I claim:

1. A radiant-energy tool comprising:
    a housing adapted to accommodate a source of energy; and
    an elongate extension having a proximal portion connected to the housing and a distal portion opposite the proximal protion and adapted to radiate energy;
    the elongate extension conducting energy from the energy source to the distal portion to facilitate the radiation of energy from the distal portion;
    the extension being formed in such a manner that it can be easily flexed by hand to assume a plurality of different shapes and can retain a given shape indefinitely;
    whereby the housing and the distal portion can each be conveniently positioned and oriented independently of the other; and
    wherein the housing is formed with a peripheral groove for accommodating the extension so that the extension can be wrapped around the housing for storage.

2. A radiant-energy tool according to claim 1 that functions as a flashlight and comprises a light bulb mounted in the distal portion, a battery pack mounted in the housing, and electrical leads mounted in the extension and connecting the light bulb to the battery pack.

3. A radiant-energy tool according to claim 1 that functions as a fire starter and stores a flammable fluid in the housing and wherein the extension is hollow and conducts the fluid to the distal end to support a flame.

* * * * *

REEXAMINATION CERTIFICATE (3307th)
United States Patent [19]
Zeller

[11] B1 5,369,556
[45] Certificate Issued  *Aug. 26, 1997

[54] RADIANT-ENERGY TOOL WITH FLEXIBLE EXTENSION

[76] Inventor: Noel E. Zeller, c/o Zelco Industries, Inc., 630 S. Colmbus Ave., Mount Vernon, N.Y. 10551-4445

Reexamination Request:
No. 90/004,161, Mar. 1, 1996

Reexamination Certificate for:
Patent No.: 5,369,556
Issued: Nov. 29, 1994
Appl. No.: 97,852
Filed: Jul. 26, 1993

[*] Notice: The portion of the term of this patent subsequent to Oct. 13, 2009, has been disclaimed.

Related U.S. Application Data

[63] Continuation-in-part of Ser. No. 743,572, Aug. 9, 1991, Pat. No. Des. 337,839, which is a continuation-in-part of Ser. No. 866,035, Apr. 9, 1992, abandoned, which is a continuation of Ser. No. 743,013, Aug. 9, 1991, Pat. No. 5,154,483.

[51] Int. Cl.$^6$ .................................................. F23D 14/28
[52] U.S. Cl. ........................................ 431/344; 126/25 B
[58] Field of Search .................................................. 431/344

[56] References Cited

U.S. PATENT DOCUMENTS

| | | |
|---|---|---|
| D. 281,820 | 12/1985 | Oba et al. |
| D. 306,351 | 2/1990 | Charet et al. |
| D. 337,839 | 7/1993 | Zeller |
| 642,648 | 2/1900 | Van Duzer |
| 1,108,350 | 8/1914 | Farber |
| 1,692,394 | 11/1928 | Sundh |
| 2,071,557 | 2/1937 | Miyaoka |
| 2,648,762 | 8/1953 | Dunkleberger |
| 3,103,723 | 9/1963 | Becker |
| 3,118,614 | 1/1964 | Mosca |
| 3,349,236 | 10/1967 | Sicho |
| 3,393,311 | 7/1968 | Dahl |
| 3,393,312 | 7/1968 | Dahl |
| 3,735,119 | 5/1973 | Williams, Jr. |
| 3,852,587 | 12/1974 | Koehler |
| 4,317,162 | 2/1982 | Richards et al. |
| 4,347,553 | 8/1982 | Saron |
| 4,369,487 | 1/1983 | Carlow |
| 4,392,185 | 7/1983 | Grossman et al. |
| 4,443,831 | 4/1984 | Godfrey et al. |
| 4,495,550 | 1/1985 | Visciano |
| 4,517,499 | 5/1985 | Saron |
| 4,535,391 | 8/1985 | Hsiao |
| 4,538,983 | 9/1985 | Zeller et al. |
| 4,912,612 | 3/1990 | Giorgi |
| 5,154,483 | 10/1992 | Zeller |
| 5,199,865 | 4/1993 | Liang |

FOREIGN PATENT DOCUMENTS

| | | |
|---|---|---|
| 137503 | 4/1985 | European Pat. Off. |
| 971866 | 10/1964 | United Kingdom |
| 2156499 | 10/1985 | United Kingdom |

*Primary Examiner*—Carroll Dority

[57] ABSTRACT

A radiant-energy tool (e.g., a flashlight or fire starter) comprises a housing adapted to accommodate an energy source (e.g., a battery pack or a fuel tank) and an elongate extension having a proximal end connected to the housing and a distal end opposite the proximal end adapted to release radiant energy. The extension connects the energy source to the distal end and is formed of a material that can be easily flexed by hand to assume a plurality of different shapes and that can retain a given shape indefinitely. The housing and the distal end of the extension can each be conveniently positioned and oriented independently of the other. The housing is formed with a peripheral groove for accommodating the extension so that the extension can be wrapped around the housing for storage and to provide a compact configuration for use.

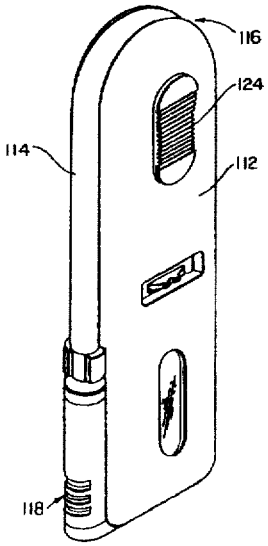

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1 and 3 are determined to be patentable as amended.

1. A radiant-energy tool comprising:
   a housing adapted to accommodate a source of energy; and
   an elongate extension having a proximal portion connected to the housing and a distal portion opposite the proximal portion and adapted to radiate energy;
   the elongate extension conducting energy from the energy source to the distal portion *to form a burner* to facilitate the radiation of energy from the distal portion;
   the extension being formed in such a manner that it can be easily flexed by hand to assume a plurality of different shapes and can retain a given shape indefinitely;
   whereby the housing and the distal portion can each be conveniently positioned and oriented independently of the other; [and]
   wherein the housing is formed with a peripheral groove for accommodating the extension so that the extension can be wrapped around the housing for storage; *and*
   *wherein the tool functions as a fire starter.*

3. [A radiant-energy tool according to claim 1 that] *A radiant-energy tool comprising:*
   *a housing adapted to accommodate a source of energy; and*
   *an elongate extension having a proximal portion connected to the housing and a distal portion opposite the proximal portion and adapted to radiate energy;*
   *the elongate extenson conducting energy from the energy source to the distal portion to facilitate the radiation of energy from the distal portion;*
   *the extension being formed in such a manner that it can be easily flexed by hand to assume a plurality of different shapes and can retain a given shape indefinitely;*
   *whereby the housing and the distal portion can each be conveniently positioned and oriented independently of the other; and*
   *wherein the housing is formed with a peripheral groove for accommodating the extension so that the extension can be wrapped around the housing for storage; and*
   wherein the tool functions as a fire starter and stores a flammable fluid in the housing and wherein the extension is hollow and conducts the fluid to the distal end to support a flame.

* * * * *